Nov. 28, 1933.  W. A. BLUME  1,937,140

FRICTION BRAKE SHOE

Filed April 3, 1931  2 Sheets-Sheet 1

Inventor:
By William A. Blume
Wm. O. Bell
Atty.

Nov. 28, 1933.    W. A. BLUME    1,937,140
FRICTION BRAKE SHOE
Filed April 3, 1931    2 Sheets-Sheet 2

Inventor:
William A. Blume
By Wm. O. Belt, Atty.

Patented Nov. 28, 1933

1,937,140

UNITED STATES PATENT OFFICE 1,937,140

FRICTION BRAKE SHOE

William A. Blume, Detroit, Mich., assignor to American Brakeblok Corporation, New York, N. Y., a corporation of New York Application April 3, 1931. Serial No. 527,397

3 Claims. (Cl. 188—251)

This invention relates to friction blocks or shoes for friction brakes and while it is especially adapted for use in automotive brakes it can be used with satisfactory results in many other kinds of brake assemblies.

One of the objects of the invention is to provide a brake block having a composition body with a reenforcing and supporting back mechanically secured to the body and having a coefficient of expansion approximating that of the body.

Another abject is to provide the composition body of a brake block with a strong, tough, substantial, heat-resisting, non-brittle and slightly flexible back mechanically bonded to the body.

Another object is to provide the composition body of a brake block with a moisture, acid and oil proof back which will stand the strains of service and hold the body intact under general service conditions until it is worn out.

Another object is to provide a brake block having a composition body with a back mechanically secured thereto and consisting mainly of fibrous material and having a high coefficient of friction and adapted to cling snugly to the block support and co-operate with the fastening devices in holding the block securely on the support and thereby avoiding the disadvantages which result from movement of the block on its support.

The invention has other objects in view which will be indicated in the detail description hereafter in connection with the drawings which represent one embodiment of the invention and referring to which, Fig. 1 is an edge view of a block embodying the invention.

Figure 1:
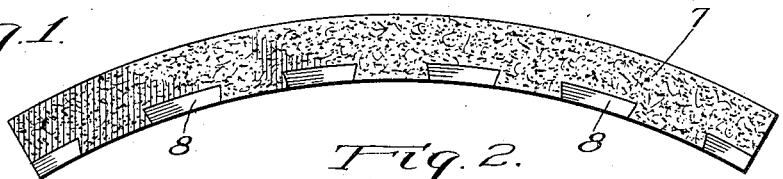
Figure 2:
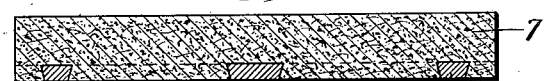
Fig. 2 is a sectional view on the line 2—2 of Fig. 3.
Figure 3:
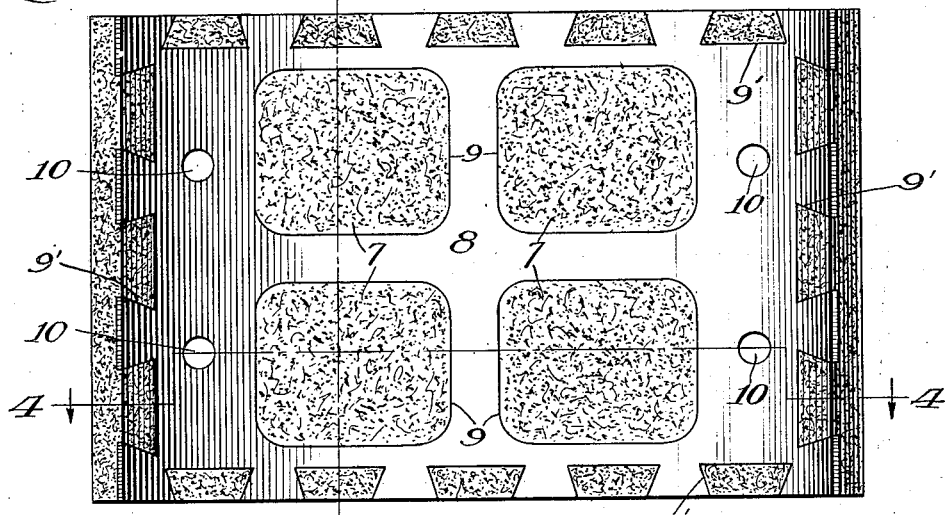
Fig. 3 is a plan view of the back of the block.
Figure 4:
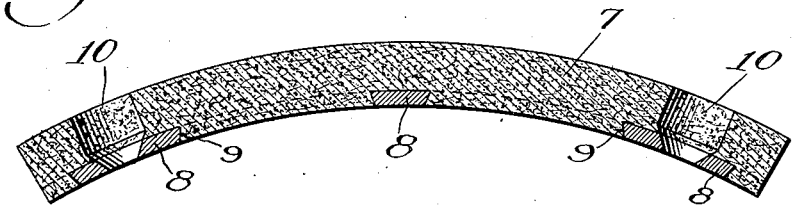
Fig. 4 is a sectional view on the line 4—4 of Fig. 3.
Figure 5:
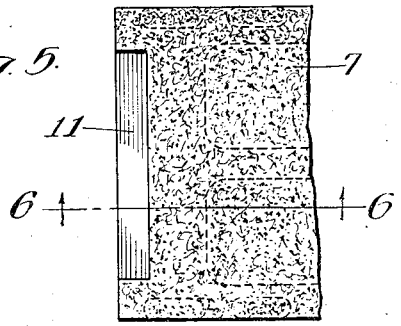
Fig. 5 is a smaller fragmentary view of the face of an end portion of the block.
Figure 6:
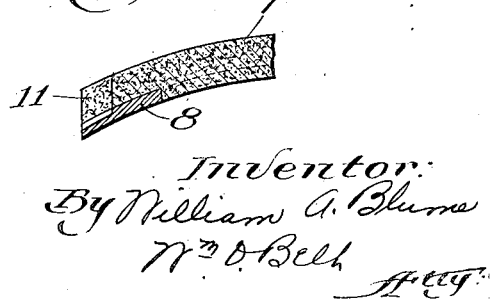
Fig. 6 is a sectional view on the line 6—6 of Fig. 5.

Referring to Figs. 1 to 6 of the drawings, 7 is the body and 8 is the back of the block. The body is preferably composed chiefly of fibrous material, such as asbestos, bonded together with a suitable binder. It is preferred that asbestos be used as the fibrous material because asbestos is heat resistant and has low heat conductivity. A body composition which may be used is disclosed in Patents No. 1,761,057 and No. 1,761,318, patented June 3, 1930. I do not make any claim herein to the particular composition of the body of the block and refer to these patents as indicating a composition which may be used but without limiting the invention thereto because the block may be made of any kind of body composition that may be found desirable.

The back 8 is made principally of fibrous asbestos or other fibrous heat-resistant material suitably bonded with a heat-resisting binder. I may use a back composition consisting of 90% fibrous asbestos and 10% of a heat-resisting binder such as highly polymerized oil of vegetable origin, tung oil, or a phenolic resin, the object of the binder being primarily to bond the fibers of the fibrous material together without necessarily saturating the fibers. The use of asbestos in the back composition is preferred because it is heat resistant and has low heat conductivity, which properties are advantageous in the back as well as in the body. The fibrous base and the binder may be mixed in a dough-like mass and calendered into sheet form and the volatile matter eliminated in any suitable manner. A small quantity of rubber may be used in the binder if desired but it should not be sufficient to lessen the heat-resisting quality of the back. The back may be made in skeleton form with large enclosed openings 9 of suitable shape therein and dovetail recesses 9' in its side and end edges to receive the body composition which is molded or otherwise applied to the back to mechanically secure the body and back together. The block may be made in any size and shape required and the back may be cured separately and the body composition applied thereto or the back and body may be cured together after the block has been made. The back is strong and substantial, tough and non-shrinkable; its strength is due to the interlocking fibers which are strongly bonded together. The back is heat-resistant and will stand approximately 1200° F. under pressure. It has been the practice heretofore to provide a composition friction block with a back made of metal or other material having a coefficient of expansion considerably different from that of the body and this difference in the coefficient of expansion between the back and the body is liable to result in loosening the body on the back and disruption of the body at its juncture with the back and final crumbling of the body, thereby shortening its life.

My invention provides a back which has approximately the same coefficient of expansion as the body and avoids the disadvantages which result from the use of a back having a materially different coefficient of expansion to that of the body. The back also has a high coefficient of friction which causes it to cling snugly to its support in service and tends to prevent shearing strain on the means which are employed for fastening the block to its support. The portions of the body filling the openings in the back co-operate with the back in this effect. This also tends to eliminate vibration and movement of the block on its support which is objectionable for many reasons and because it is liable to cause squealing. By making the back with openings to receive the body composition in the manufacture of the block, I find that the body will be secured to the back sufficient for all ordinary service conditions, but for some purposes it may be desirable to employ other means for securing the body on the back and any such means may be resorted to if found desirable for this purpose. The outer edges of the back and about the openings 9 and recesses 9' are preferably beveled to receive the body material and anchor the body on the back. The block may be provided with openings 10 to receive bolts for securing the block on its support or it may be provided with a recess 11 at one or both ends to receive suitable securing clamps.

Figure 7:
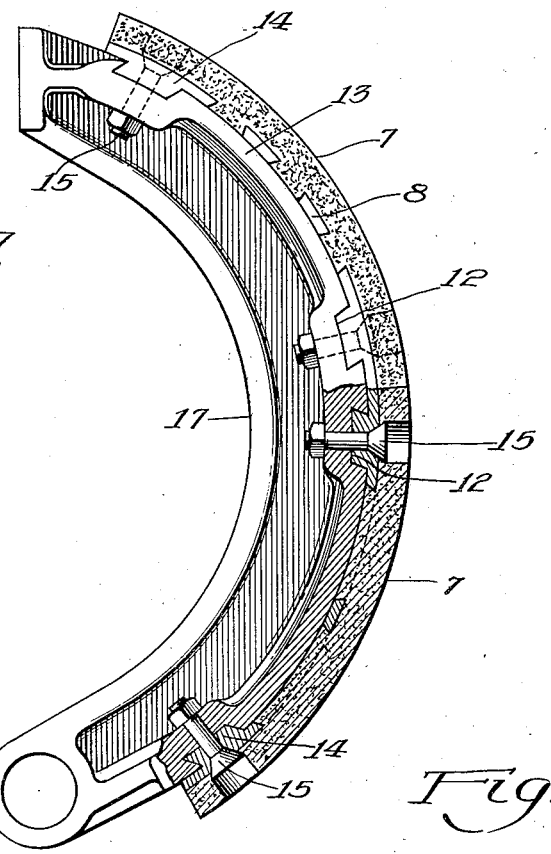
Fig. 7 is a sectional view showing another embodiment of the invention on a support.
Figure 8:
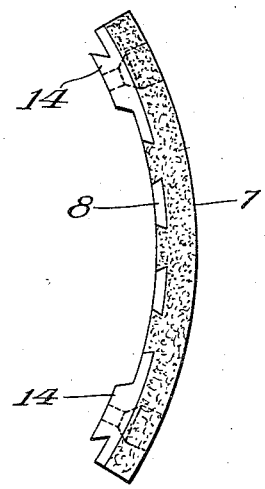
Fig. 8 is an edge view of the block shown in Fig. 7.
Figure 9:
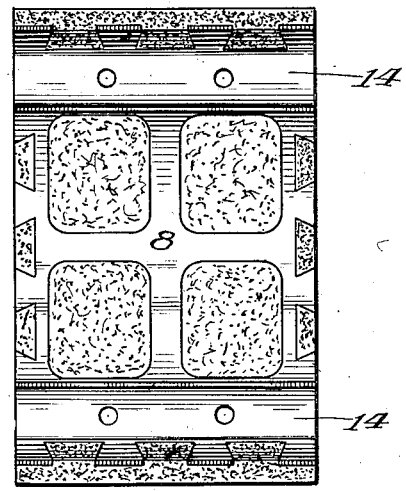
Fig. 9 is a plan view of the back of the block shown in Figs. 7 and 8.

Some block supports are made in the form indicated by 17 in Fig. 7 and variously termed an arm or head or shoe. This support is often provided with transverse slots 12 in its face plate 13 to receive keepers or other securing means. I may provide the back for my block with integral lugs 14 to fit these slots so that the block will have a solid bearing throughout on the support and the lugs will co-operate with the securing bolts 15 to retain the blocks in fixed position on the support.

I have shown the invention in a form which is suitable for internal friction brakes for automotive vehicles but the invention is capable of embodiment in friction elements of many different kinds and for many different purposes, and I reserve the right to make any such embodiments and to make any changes in the form, construction and arrangement of parts and in materials and proportions thereof within the scope of the following claims:

I claim:

1. A friction element comprising a composition body consisting of material having a high coefficient of friction and low heat conductivity, and a composition back mechanically secured to the body, the element being adapted to be mounted on a support with the back in contact therewith, said back also consisting of material of low heat conductivity and having substantially the same coefficient of expansion as the body and also having a high coefficient of friction to resist relative movement between itself and the support.

2. A friction element adapted to be mounted on a support and comprising a composition body and a composition back each mainly composed of fibrous material of low heat conductivity and bonded together and having a high coefficient of friction and substantially the same coefficient of expansion, said back having openings therein and portions of the body filling said openings to mechanically unite the body and back, the body material in said openings cooperating with the back to form a continuous contact face on the element to engage the support and said contact face having a high coefficient of friction to resist relative movement between the element and support.

3. A friction element adapted to be mounted on a support comprising a composition body having low heat conductivity and a non-metallic composition back mechanically secured to the body, said back being low in heat conductivity and being slightly flexible, non-shrinkable, heat-resisting, moisture, acid and oil-proof and having a high coefficient of friction to resist relative movement between the element and the support.

WILLIAM A. BLUME.